United States Patent [19]

Smits et al.

[11] Patent Number: 4,997,706

[45] Date of Patent: Mar. 5, 1991

[54] FOAMING SYSTEM FOR CLOSED-CELL RIGID POLYMER FOAM

[75] Inventors: Guido F. Smits, Wijnegem, Belgium; Johan A. Thoen, Terneuzen, Netherlands

[73] Assignee: The Dow Chemical Company, Midland, Mich.

[21] Appl. No.: 477,685

[22] Filed: Feb. 9, 1990

[51] Int. Cl.$^5$ .............................................. B32B 3/26
[52] U.S. Cl. ........................... 428/304.4; 428/305.5; 428/314.4; 521/131; 521/902
[58] Field of Search ............... 428/304.4, 305.5, 314.4, 428/314.8; 521/131, 902

[56] References Cited

U.S. PATENT DOCUMENTS

| | | | |
|---|---|---|---|
| 3,911,190 | 10/1975 | Myers et al. | 428/305.5 |
| 4,133,931 | 1/1979 | Beale et al. | 428/305.5 |
| 4,351,873 | 9/1982 | Davis | 428/305.5 |
| 4,795,763 | 1/1989 | Gluck et al. | 521/99 |

FOREIGN PATENT DOCUMENTS 1098683 12/1988 Japan.

*Primary Examiner*—William J. Van Dalen

[57] ABSTRACT

This invention relates to the use of a $C_{2-6}$ polyfluorocarbon compound containing no chlorine or bromine atoms as physical blowing agent in the preparation of rigid, closed-cell, polymer foams. Use of such blowing agents, especially 1,1,1,2-tetrafluoroethane (R-134a), in the preparation of polyurethane or polyisocyanurate foams provided for products in which the loss in thermal insulation performance with time compared to products prepared in absence of such blowing agents is reduced.

15 Claims, No Drawings

FOAMING SYSTEM FOR CLOSED-CELL RIGID POLYMER FOAM

BACKGROUND OF THE INVENTION

This invention relates to a closed-cell rigid polymer foam prepared in the presence of a physical blowing agent comprising a $C_{2-6}$ polyfluorocarbon compound containing no chlorine or bromine atoms.

The usefulness of foamed plastic materials in a variety of applications is well-known. Rigid closed-cell polymer foams such as, for example, polyurethanes and polyisocyanurate foams are widely used as insulating structural members.

The good insulative properties of such foams are provided for by firstly the fact that they are fine closed-celled foams and secondly the closed-cell contains within a gas mixture which has a high thermal resistance or in the alternative a low thermal conductivity.

Generally, polyurethane and polyisocyanurate foams are prepared by reacting an organic polyisocyanate with an active hydrogen-containing compound in the presence of a blowing agent or agents. Generally, such blowing agents are inert organic compounds which do not decompose or react during the polymerization reaction and which as a result of the exothermic reaction if not already in the gaseous phase become converted to a gaseous phase. The gas becomes encapsulated in the liquid phase of the polymerizing reaction mixture resulting in the formation of cells, causing the reaction mixture to expand and form a foam which subsequently cures to become a rigid closed-cell foam.

Frequently used blowing agents, until recently, have been the fully halogenated chlorofluorocarbons, especially trichlorofluoromethane (Refrigerant, R-11). However, the continued use of such chlorofluorocarbon blowing agents is undesirable in view of the current opinion that their presence in earth's upper atmosphere may be a contributory factor in the recently observed reduction of the ozone concentrations.

The current commercial trend for the production of such closed-cell polymer foam is to replace the fully halogenated chlorofluorocarbons with hydrogen-containing chlorofluorocarbon compounds. These alternative blowing agents are selected as they have been identified as having significantly lower ozone depletion potentials relative to R-11. Such alternative hydrogen-containing blowing agents include dichlorotrifluoroethane (R-123), dichlorofluoroethane (R-141b), chlorodifluoromethane (R-22) and difluorochloroethane (R-142b), the use of which in the preparation of polyurethane foam has been described: see, for example, U.S. Pat. Nos. 4,076,644; 4,264,970; and 4,636,529.

However, a significant disadvantage of replacing the R-11 gas contained within the cells of the foam by such alternative compounds is a frequent loss in the initial and aged thermal insulation performance of the foam. Such loss occurs due to the generally higher gas thermal conductivities of the replacement blowing agents.

If insulative foam, especially polyurethane foam is to remain commercially attractive and be able to comply with various national standards relating to energy consumption, it is important that the foam is able to retain a good thermal insulation performance with time. This is especially critical where, because of other factors dictating the selection of blowing agents, the initial thermal conductivities of the foam may already be relatively high.

The thermal insulation properties of closed-cell foam, especially polyurethane and polyisocyanurate foam are known to become inferior with time. The loss of thermal insulation properties of a foam generally results from diffusion into the closed cells of high thermal conductivity gases, particularly nitrogen and oxygen or alternatively loss of cell gas having lower thermal conductivities. It is therefore desirable to provide for a means of limiting such loss.

One possible means to prevent loss of thermal insulation properties would be to use, for example, a gas impermeable barrier surrounding the foam. However, in most foam applications this is not a practical solution.

Alternatively, the foam could be modified to minimize or prevent loss of thermal insulating efficiency with time. With respect to this latter approach, the open literature contains relatively few teachings as to how rigid, closed-cell polymer foams might be modified to give products exhibiting an enhanced retention, or minimized loss, of thermal insulation performance with time.

U.S. Pat. No. 4,795,763 discloses carbon black-filled polyurethane foam exhibiting improved aged-thermal insulation properties. Japanese Patent Application No. 57-147510 discloses the use of carbon black to provide for lower initial thermal conductivities of the foam. The selection of graphite over carbon black for the preparation of foam from a thermoplastic resin having increased initial thermal insulation properties is disclosed by Japanese Patent Application No. 63-183941.

However, the use of fillers such as, for example, carbon black and graphite for enhancement of foam thermal insulation properties is not always possible as other physical properties of the resulting foam and processibility leading to the foam may suffer. Particularly, a high filler content can lead to highly friable and open-celled foams. Open-celled foams do not provide the desirable thermal insulation performance normally offered by closed-cell foams.

It is therefore desirable to consider the use of alternative blowing agents which provide for closed-cell foam having improved thermal insulation properties whilst additionally maintaining the overall desirable foam physical properties and processibility.

In the art, the term "thermal insulation" may be interchanged with the term "K-factor" or "thermal resistance" when discussing thermal physical properties of foams and gases.

SUMMARY OF THE INVENTION

It has now been discovered that rigid closed-cell polymer foams having improved aged thermal insulation properties may be prepared in the presence of blowing agents or compositions comprising a polyfluorocarbon compound.

In one aspect, this invention is a closed-cell rigid polymer foam prepared from a foam-forming composition containing a physical blowing agent present in up to about 20 weight percent, based on the total weight of the composition, and characterized in that the physical blowing agent comprises a $C_{2-6}$ polyfluorocarbon compound containing no chlorine or bromine atoms, and in that the cells of the foam contain the polyfluorocarbon compound as a gas in an amount which reduces the thermal insulation loss of the foam relative to the thermal insulation loss, with time, of the same foam having the same density and prepared from the same foam-forming composition in the presence of an equivalent molar quantity of blowing agent in which a $C_{2-6}$ polyfluorocarbon compound, containing no chlorine or bromine atoms, is absent.

In a second aspect, this invention is a process for producing a closed-cell rigid polyurethane or polyisocyanurate polymer foam containing within its cells a gas mixture comprising a $C_{2-6}$ polyfluorocarbon compound containing no chlorine or bromine atoms and characterized in that
(a) an isocyanate-containing compound is mixed and allowed to react with an active hydrogen-containing compound in the presence of up to about 20 weight percent, based on combined weight of isocyanate-containing compound and active hydrogen-containing compound, of a physical blowing agent comprising the polyfluorocarbon compound, and
(b) wherein the cells of the resulting foam comprise the polyfluorocarbon compound in an amount which reduces the thermal insulation loss of the foam relative to the thermal insulation loss, with time, of the same foam having the same density and prepared from the same foam-forming composition in the presence of an equivalent molar quantity of blowing agent in which a $C_{2-6}$ polyfluorocarbon compound, containing no chlorine or bromine atoms, is absent.

In a third aspect, this invention is an active hydrogen-containing composition suitable for reacting with an isocyanate-containing compound in the preparation of a closed-cell rigid polyurethane or polyisocyanurate foam characterized in that the composition comprises
(a) an hydrogen-containing compound having at least 2 active hydrogen atoms per molecule and having an equivalent weight of from about 50 to about 700, and
(b) from about 1 to about 20 weight percent, based on a combined weight of (a) and (b) present, of a physical blowing agent comprising a $C_{2-6}$ polyfluorocarbon compound containing no chlorine or bromine atoms, which provides for a foam wherein the thermal insulation loss of the foam relative to the thermal insulation loss, with time, of the same foam having the same density and prepared from the same active hydrogen-containing composition in the presence of an equivalent molar quantity of blowing agent in which a $C_{2-6}$ polyfluorocarbon compound, containing no chorine or bromine atoms, is absent.

In a fourth aspect, this invention is a laminate comprising at least one facing sheet adhered to the polymer foam as described in the first aspect.

In a fifth aspect, this invention is a process for preparing a laminate as described in the fourth aspect.

These findings are surprising in view of the fact that substituting fully halogenated or hydrogen-containing chlorofluorocarbons with polyfluorocarbons having significantly higher gas thermal conductivities would not be expected to reduce relative thermal insulation losses and in some instances actually provide foam exhibiting superior insulation properties on aging. The findings are especially significant when considered in combination with the desire to use foaming systems having minimized ozone depletion potentials.

DETAILED DESCRIPTION OF THE INVENTION

As described hereinabove, in one aspect this invention is a closed-cell rigid polymer foam prepared from a foam-forming composition containing a physical blowing agent.

The foam-forming composition used to prepare the foam of this invention may be a thermoplastic composition comprising, for example, a thermoplastic polyethylene or a polystyrene polymer or the like. However, preferred foam-forming compositions are those which lead to the preparation of thermoset polymers, especially polyurethane and polyisocyanurate polymers. Such thermoset foam-forming compositions are preferred because of the ability to prepare fine-celled polymers by foam-in-place procedures. To provide for the optimum physical foam properties including thermal insulation advantageously, the average cell size of the foam is less than about 0.5, preferably less than about 0.45, and more preferably less than about 0.4 mm.

The composition contains the physical blowing agent in a quantity sufficient to provide a foam having an overall density of from about 10 to about 200, preferably from about 10 to about 100, more preferably from about 15 to about 80 and most preferably from about 18 to about 60 kg/m$^3$.

To provide for such foam densities, the physical blowing agent advantageously is present in quantities up to and including 20 weight percent based on the total weight of the foam-forming composition, including physical blowing agent present. Foams having the higher densities are prepared in the presence of lower quantities of the physical blowing agent. When blowing agent precursor compounds are present in the composition the total quantity of physical blowing agent required to produce foams of the desired densities will be reduced.

The physical blowing agent used to prepare the foam of this invention is characterized in that it comprises at least one component which is a $C_{2-6}$ polyfluorocarbon compound containing no chlorine or bromine atoms. Preferably the blowing agent comprises at least one polyfluorocarbon compound which is a $C_{2-3}$ compound.

The polyfluorocarbon compound component of the physical blowing agent is present in an amount which provides for reduced thermal insulation losses of the foam. Advantageously, the polyfluorocarbon compound component of the physical blowing agent is present in from about 0.5 to about 15, preferably from about 1.0 to about 10 and more preferably from about 1.5 to about 8.0 weight percent based on total weight of the foam-forming composition and physical blowing agent present. When used in combination with a blowing agent precursor compound these quantities of polyfluorocarbon compound may account for the physical blowing agent requirement in its entirety.

The absence of chlorine or bromine atoms is desirable as such compounds generally have very low or zero ozone depletion potentials relative to trichlorofluoromethane (R-11). Advantageously, the compounds used as physical blowing agents including the polyfluorocarbon compounds used in this present invention exhibit relative ozone depletion potentials, as currently recognized, of less than about 0.15, preferably less than about 0.05, more preferably less than 0.01 and most preferably zero.

The polyfluorocarbon compound is further characterized by advantageously having a boiling point at standard atmospheric pressure of less than about 65° C., preferably less than about 45° C., more preferably less than about 25° C. and most preferably less than about 0° C. Use of polyfluorocarbon compounds having a boiling point above 65° C. may not be desirable if resulting foams are to exhibit good low temperature dimensional stability. To allow for convenient handling and foaming of the composition advantageously, the polyfluorocarbon compound has a boiling point of at least −60° C., preferably at least −40° C. and more preferably at least −30° C.

To provide for desirable initial thermal insulation properties of the foam of this present invention it is further advantageous if the polyfluorocarbon compound when in a gaseous phase exhibits a gas thermal conductivity of less than about 20, preferably less than about 18 and more preferably less than about 16 mW/MK at 25° C.

Polyfluorocarbon compounds are preferred over monofluorocarbon compounds as they generally have a reduced flammability which may be of importance for some foam applications.

Exemplary of $C_{2-6}$ polyfluorocarbon compounds suitable for use as physical blowing agents when preparing the foams of this invention are the polyfluoroethanes including 1,1-difluoroethane (R-152a), 1,2-difluoroethane (R-152), 1,1,1-trifluoroethane (R-143a), 1,1,2-trifluoroethane (R-143), 1,1,1,2-tetrafluoroethane (R-134a), 1,1,2,2-tetrafluoroethane (R-134), pentafluoroethane (R-125) and hexafluoroethane (R-116): and the polyfluoroethylenes including 1,2-difluoroethylene (R-1132).

Other polyfluorocarbon compounds suitable for use in this present invention also include the perfluorinated $C_{2-6}$ compounds such as, for example, perfluoropropane, perfluorobutane, perfluoro-n-pentane and isomers thereof, perfluoro-n-hexane, perfluoroacetone, mixtures thereof and the like.

Equally suitable for this present invention are cyclic polyfluorocarbon compounds including perfluorocyclopropane (C-216), perfluorocyclobutane (C-318), 1,1,2,2-tetrafluorocyclobutane (C-354) and 1,2,3,3,4,4-hexafluorocyclobut-1,2-ene (C-1316).

The above listed polyfluorocarbon compounds may also be used in admixture or in admixture with additional secondary blowing agents providing for the complete blowing requirement to give foams of a desired density. Suitable secondary blowing agents are listed later.

The preferred polyfluorocarbon compounds for this present invention are the polyfluoroethanes, especially 1,1,1,2-tetrafluoroethane (R-134a): and the perfluorocarbon compounds, especially perfluoro-n-hexane. These compounds are preferred due to their ready availability and currently recognized low ozone depletion potentials.

As already mentioned, the foam of this present invention is characterized in that it exhibits a reduced thermal insulation loss in comparison to the same foams having effectively the same overall density and being prepared from the same foam-forming composition but in the absence of a $C_{2-6}$ polyfluorocarbon physical blowing agent containing no chlorine or bromine atoms. The same density is obtained by use of alternative blowing agent(s) in a quantity which provides for an equivalent molar quantity, volume, of gas.

To obtain such reduction in thermal insulation loss the initial gas composition within the closed cells of the foam advantageously comprises up to about 60 mole percent, based on molar quantities of all gases present within the cell, of the $C_{2-6}$ polyfluorocarbon compound. Preferably, the initial gas composition of the closed cells comprises from about 5 to about 55, more preferably from about 10 to about 55 and most preferably from about 15 to about 50 mole percent of the polyfluorocarbon compound, the remaining part of the cell gas composition being obtained from secondary physical blowing agents and/or blowing agent precursor compounds.

In a preferred embodiment of this invention when the rigid polymer foam is a polyurethane or polyisocyanurate polymer, especially prepared in the presence of a blowing agent precursor such as, for example, water providing carbon dioxide gas: the initial gas composition within the closed cells of the foam comprises (a) from about 1 to about 60 mole percent, based on the combined mole quantities of (a) and (b) present, of a $C_{2-6}$ polyfluorocarbon compound containing no chlorine or bromine atoms, and (b) from about 40 to about 99 mole percent, based on the combined quantities of (a) and (b) present, carbon dioxide.

Preferably, the initial cell gas composition comprises the polyfluorocarbon compound in from about 5 to about 55, more preferably from about 10 to about 55 and most preferably from about 15 to about 50 mole percent, whilst the same mixture comprises the carbon dioxide in preferably from about 45 to about 95, more preferably in from about 45 to about 90, and most preferably in from about 50 to about 85 mole percent.

Although foams having initial cell gas compositions comprising mole quantities of polyfluorocarbon compound(s) and carbon dioxide outside these given ranges may be prepared, such foams may not exhibit the advantageous thermal insulation aging characteristics as the foams of this present invention.

Reference is made to "initial" gas compositions, as with time the composition of such cell gas mixtures may change due to diffusion in and out of environmental gases and cell gases respectively.

In the second aspect of this invention, a process for the preparation of a rigid, closed-cell polymer foam is disclosed. Particularly, the disclosed process relates to the preparation of a thermoset polymer which is a polyurethane or polyisocyanurate foam containing within its cells a gas mixture comprising a $C_{2-6}$ polyfluorocarbon compound containing no chlorine or bromine atoms.

The process is characterized in that an isocyanate-containing compound is mixed and allowed to react with an active hydrogen-containing compound in the presence of up to about 20 weight percent, based on total combined weights of isocyanate-containing and active hydrogen-containing compound present, of a physical blowing agent comprising a $C_{2-6}$ polyfluorocarbon compound containing no chlorine or bromine atoms.

In the process of the invention, advantageously the polyfluorocarbon compound component of the physical blowing agent is present in from about 0.5 to about 17, preferably from about 1.0 to about 10, and more preferably in from about 1.5 to about 8.0 weight percent based on the combined weights of isocyanate-containing material and active hydrogen-containing compound present. Suitable and preferred polyfluorocarbon compounds for use in the process are as already described.

Isocyanate-containing compounds suitable for use in the process of this invention are organic polyisocyanate compounds having an average isocyanate content of from about 20 to about 50, and preferably from about 25 to about 35 weight percent.

Polyisocyanates suitable for use in the process of this invention include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl--2,4-phenyldiisocyanate, diphenylmethane-4,4'-diisocyanate, diphenylmethane-2,4'-diisocyanate, 4,4'-biphenylene diisocyanate, 3,3'-dimethoxy-4,4'-diphenylenediisocyanate and 3,3'-dimethyldiphenylpropane-4,4'-diisocyanate: triisocyanates such as toluene-2,4,6-triisocyanate and polyisocyanates such as 4,4'-dimethyldiphenylmeth- ane-2,2',5',5'-tetraisocyanate and the diverse polymethylene polyphenyl polyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude methylene diphenylamine. The preferred undistilled or crude polyisocyanates are disclosed in U.S. Pat. No. 3,215,652, incorporated herein b reference.

Especially preferred are methylene-bridged polyphenyl polyisocyanates, due to their ability to cross-link the polyurethane.

The isocyanate is used in a quantity sufficient to provide for a well cross-linked rigid, closed-cell foam. Advantageously the isocyanate index, ratio of isocyanate moieties to active hydrogen atoms present in the foam-forming composition, is from about 0.9 to about 5.0, preferably about 0.9 to about 3.0, more preferably about 1.0 to about 2.0 and most preferably from about 1.0 to about 1.6.

Active hydrogen-containing compounds which are useful in this present invention include those materials having two or more groups which contain an active hydrogen atom that will react with an isocyanate, such as is described in U.S. Pat. No. 4,394,491 and incorporated herein by reference. Preferred among such compounds are materials having hydroxyl, primary or secondary amine, carboxylic acid, or thiol groups. Polyols, i.e., compounds having at least two hydroxyl groups per molecule, are especially preferred due to their desirable reactivity with polyisocyanates.

Suitable active hydrogen-containing compounds for preparing rigid polyisocyanate-based foams include those having an equivalent weight of about 50 to about 700, preferably from about 70 to about 300, more preferably from about 90 to about 200. Such active hydrogen-containing compounds advantageously have at least 2, preferably from about 3, and advantageously up to about 16 and preferably up to about 8 active hydrogen atoms per molecule. The number of active hydrogen atoms may also be referred to as "functionality". Active hydrogen-containing compounds which have functionalities and equivalent weights outside these limits may also be used, but the resulting foam properties may not be desirable for a rigid application.

Suitable additional isocyanate-reactive materials include polyether polyols, polyester polyols, polyhydroxyl-terminated acetal resins, hydroxyl-terminated amines and polyamines, and the like. Examples of these and other suitable isocyanate-reactive materials are described more fully in U.S. Pat. No. 4,394,491, particularly in columns 3–5 thereof. Most preferred for preparing rigid foams, on the basis of performance, availability and cost, is a polyol prepared by adding an alkylene oxide to an initiator having from about 2 to about 8, preferably from about 3 to about 8 active hydrogen atoms. Exemplary of such polyether polyols include those commercially available under the trademark, VORANOL and include VORANOL 202, VORANOL 360, VORANOL 370, VORANOL 446, VORANOL 490, VORANOL 575, VORANOL 800, all sold by The Dow Chemical Company, and Pluracol* 824, sold by BASF Wyandotte.

Other most preferred polyols include alkylene oxide derivatives of Mannich condensate as taught in, for example, U.S. Pat. Nos. 3,297,597: 4,137,265 and 4,383,102 and incorporated herein by reference, and amino-alkylpiperazine-initiated polyether polyols as described in U.S. Pat. Nos. 4,704,410 and 4,704,411 also incorporated herein by reference.

In addition to the foregoing critical components, it is optional but often desirable to employ certain other ingredients in preparing polyisocyanate-based foams. Among these additional ingredients are secondary physical blowing agents and blowing agent precursor compounds, catalysts, surfactants, flame retardants, preservatives, colorants, antioxidants, reinforcing agents, fillers, antistatic agents and the like.

Secondary blowing agents suitable for use in admixture with the polyfluorocarbon compound(s) providing for the complete blowing requirement when preparing the foam include physical blowing agents containing chlorine and/or bromine atoms. Preferably, such secondary blowing agents are the hydrogen-containing chlorofluorocarbon compounds exemplary of which are Refrigerant 21, Refrigerant 22, Refrigerant 123, Refrigerant 123a, Refrigerant 124, Refrigerant 124a, Refrigerant 133 (all isomers), Refrigerant 141b, Refrigerant 142, Refrigerant 151. Among these, Refrigerant 123 (all isomers), Refrigerant 141b and Refrigerant 142 (all isomers) are most preferred, as these are more readily commercially available in addition to being recognized as having low ozone depletion potentials.

In addition to the chlorofluorocarbon compounds, other low boiling compounds are also useful herein, including, for example, carbon dioxide, nitrogen, argon, pentane, and the like.

Blowing agent precursor compounds are compounds which during the preparation of the foam react with one or more components contained within the foam-forming composition generating a gas which then functions as a blowing agent. Alternative precursor compounds may generate a gas as a result of decomposition by the reaction exotherm. Exemplary of, and a preferred, blowing agent precursor compound is water which reacts with isocyanate leading to the generation of carbon dioxide gas. Other carbon dioxide generating blowing agent precursor compounds include the amine/carbon dioxide complexes such as taught in U.S. Pat. NOs. 4,735,970 and 4,500,656: incorporated herein by reference.

When water is contained in the foam-forming composition advantageously it is present in from about 0.5 to about 10.0, preferably from about 1.0 to about 7.0 and more preferably from about 2.0 to about 6.0 weight percent based on total weight of active hydrogen-containing compounds within the composition.

One or more catalysts for the reaction of the active hydrogen-containing compound with the polyisocyanate are advantageously present. Any suitable urethane catalyst may be used, including tertiary amine compounds and organometallic compounds. Exemplary tertiary amine compounds include triethylenediamine, N-methylmorpholine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl- -N',N'-dimethyl isopropylpropylenediamine, N,N-diethyl- -3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates and formation of polyisocyanurate polymers, such as an alkali metal alkoxide, alkali metal carboxylate, or quaternary amine compound, may also optionally be employed herein.

When employed, the quantity of catalyst used is sufficient to increase the rate of polymerization reaction. Precise quantities must be determined experimentally, but generally will range from about 0.001 to about 3.0 parts by weight per 100 parts active hydrogen-containing compound depending on the type and activity of the catalyst.

It is generally highly preferred to employ a minor amount of a surfactant to stabilize the foaming reaction mixture until it cures. Such surfactants advantageously comprise a liquid or solid organosilicone surfactant. Other, less preferred surfactants, include polyethylene glycol ethers of long chain alcohols, tertiary amine or alkanolamine salts of long chain alkyl acid sulfate esters, alkyl sulfonate esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by weight polyol are sufficient for this purpose.

In the process of making a polyisocyanate-based foam, the polyol(s), polyisocyanate and other components are contacted, thoroughly mixed and permitted to expand and cure into a cellular polymer. The particulate mixing apparatus is not critical, and various types of mixing head and spray apparatus are conveniently used. It is often convenient, but not necessary, to preblend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to pre-react all or a portion of the polyol(s) with the polyisocyanate to form a prepolymer.

In the third aspect of this invention, an active hydrogen-containing composition suitable for reaction with an isocyanate-containing compound in the preparation of a rigid, closed-cell polyurethane or polyisocyanurate foam is disclosed.

The active hydrogen-containing composition is characterized in that it contains at least one active hydrogen-containing compound as already described and additionally, based on the combined weight of active hydrogen-containing compound(s) and physical blowing agent present up to about 20 weight percent of a physical blowing agent comprising a $C_{2-6}$ polyfluorocarbon compound containing no chlorine or bromine atoms.

Advantageously, the polyfluorocarbon compound component of the physical blowing agent is present in the composition in from about 0.5 to about 20, preferably from about 1.0 to about 10 and more preferably from about 1.5 to about 8 weight percent.

In the fourth aspect of this invention, laminate comprising at least one facing sheet adhered to the closed-cell rigid polymer foam is disclosed. Preferably, the facing sheet which may be paper, metal, wood or a thermoplastic or thermoset polymer is adhered to a polyurethane or polyisocyanurate foam which has been prepared in the presence of a physical blowing agent comprising a $C_{2-6}$ polyfluorocarbon compound containing no chlorine or bromine atoms.

Suitable processes for preparing such a laminate are disclosed in, for example, U.S. Pat. Nos. 4,707,401 and 4,795,763; incorporated herein by reference.

The rigid closed-cell polymer foams of this invention are of value in a number of applications such as, for example, spray insulation, foam-in-place appliance foam rigid insulating board stock and laminates.

ILLUSTRATIVE EMBODIMENTS

The following examples are given to illustrate the invention and should not be interpreted as limiting it in any way. Unless stated otherwise, all parts and percentages are given by weight.

Foams are prepared using a low pressure foaming machine. Properties of the resulting foams are determined on samples taken from $20\times20\times20$ box foams having the stated molded density.

Post-demold expansion is measured in millimeters in the parallel-to-rise direction on a molded $20\times20\times20$ cm foam. The expansion is observed after a curing time of 10 minutes with an appropriate face of the mold having been opened after 3 or 4 minutes into the curing period. The observed expansion is that of the foam out of the plane of the opened face. Lower value of expansion indicates improved demold performance.

The thermal insulation, K-factor, is measured with an Anacon Model 88 Thermal Conductivity Analyzer having cold and hot plate temperatures of 10.2° C. and 37.8° C., respectively. The foam samples used to determine the aged K-factor are stored at ambient temperature, pressure and humidity conditions. Lower values (mW/MK) indicate better thermal insulative properties.

Foam compressive strengths are observed in the parallel-to-rise and perpendicular-to-rise direction using individual $5\times5\times5$ cm samples taken from the core of a molded $20\times20\times20$ foam. Compressive strengths are observed at 10 percent compression.

The average foam cell diameter is determined from a thin section of foam using a polarized-light optical microscope together with a Quantimet 520 Image Analysis system to study the cells.

The reported, calculated thermal conductivity of the gas mixture within the closed cells of the foam is according to the Lindsay-Bromley procedure, Industrial and Engineering Chemistry, Vol. 42, p. 1508 (1950) using temperature-dependent Sutherland Constant approximations as discussed.

The composition of the gas mixture considered for the calculation is that which can be anticipated if there is a full retention of all blowing agents and gases within the initial foam based on components of the reacting mixture.

The physical properties of the various blowing agents used in the following examples are summarized:

| Blowing Agent | b.p. (°C.) 760 mm/Hg | gas thermal conductivity (mW/MK) (25° C.) | Relative ozone depletion potential [1] |
|---|---|---|---|
| R-134a: $C_2H_2F_4$ | −26 | 15.5 | 0.0 |
| R-11: $CCl_3F$ | +24 | 7.9 | 1.0 |
| R-142b*: $C_2H_3ClF_2$ | −9 | 11.7 | 0.06 |
| R-22*: $CHClF_2$ | −41 | 10.6 | 0.05 |

*comparative blowing agent for the purpose of this invention
[1] potentials are relative to Refrigerant R-11

EXAMPLE 1

This example illustrates the aged thermal insulation performance of a polyurethane foam containing a cell gas mixture of about 50 mole percent carbon dioxide and about 50 mole percent physical blowing agent (based on components present in the foam-forming composition).

Sample 1 indicates the advantageous use of a $C_{2-6}$ polyfluorocarbon compound, Refrigerant 134a. Comparative samples A and B illustrate foams prepared with comparative blowing agents, Refrigerant 11 and Refrigerant 142b.

Foam properties are presented in Table I and thermal insulation properties in Table II.

The data presented in Table I indicates foams prepared with Refrigerant 134a exhibit equivalent or better mechanical physical properties than foams prepared with comparative blowing agents.

In Table II, the thermal insulation properties show that the thermal insulation loss on aging is reduced for foam comprising Refrigerant 134a in the cell gas mixture.

The higher initial foam thermal conductivity values of the example is not unexpected when considering the relative thermal conductivities of the gases. However, what is very surprising is the significantly reduced thermal insulation loss relative to the calculated cell gas conductivity of the initial gas mixture contained within the cells of the foam.

The cells of the foams initially contain 50 mole percent carbon dioxide which is able to diffuse out relatively quickly, leaving the cells with a gas mixture containing highly enriched levels of the physical blowing agent. It would therefore normally be anticipated that foams containing within their cells enriched concentrations of higher thermal conductivity gas would show significantly greater thermal insulation losses with time, but this is not observed.

Considering the difference between the calculated thermal conductivity of the initial cell gas mixture and that initially observed for the foam is indicative of heat transfer by radiation and solid conduction mechanisms as opposed to gas conduction. Once the foam structure is established, the quantity of heat transfer through the foam by solid conduction and radiation mechanisms does not change on aging and therefore any change in thermal insulation properties of a foam with time can be related specifically to the cell gas composition.

It is interesting to note that the foam prepared in the presence of Refrigerant 134a exhibits significantly lower heat transfer by the solid conduction and radiation mechanisms than the comparative foams.

TABLE I

| | Physical blowing agent (B.A.) | | |
|---|---|---|---|
| | 1 (R-134a) | A* (R-11) | B* (R-142b) |
| Polyol [1] | 100 | 100 | 100 |
| Isocyanate [2] | 157 | 157 | 157 |
| Isocyanate Index | 1.05 | 1.95 | 1.05 |
| BA wt % on polyol | 16.3 | 22 | 16 |
| BA wt % composition | 6.0 | 7.9 | 5.9 |
| Molded foam density (kg/m³) | 32.5 | 30 | 30 |
| Post-expansion (mm) | | | |
| 3 min. (10 min. cure) | 5.1 | 7.2 | 8.1 |
| 4 min. (10 min. cure) | 2.0 | 6.4 | 6.3 |
| Compressive strengths 10% compression (KPa) ⊥/∥ to rise | 164/193 | 125/72 | 119/82 |
| Average foam cell diameter (mm) | 0.44 | 0.58 | 0.60 |
| Standard deviation | 0.22 | 0.37 | 0.40 |

*Comparative example, not an example of this invention
[1] A fully formulated polyol system comprising a sucrose-glycerine initiated polyether polyol and about 3 wt % water
[2] A crude polymeric methylene diphenylisocyanate, average functionality 2.7, NCO wt percentage 31

TABLE II

| | 1 (R-134a) | A* (R-11) | B* (R-142b) |
|---|---|---|---|
| Calculated cell gas conductivity (mW/MK) | 15.91 | 11.44 | 14.54 |
| Observed Foam (mW/MK) | | | |
| conductivity: initial | 21.5 | 19.0 | 21.0 |
| : aged (47 days) | 26.3 | 23.9 | 25.6 |
| Observed loss (mW/MK) | 4.8 | 4.9 | 4.6 |
| %; observed loss/cell gas conductivity | 30.1 | 42.8 | 31.6 |

*Comparative example, not an example of this invention

EXAMPLE 2

A similar series of foams as prepared in Example 1 is prepared, however the foams differ in that the initial cell gas mixture contains 78 mole percent carbon dioxide and 18 mole percent physical blowing agent. The physical properties of the resulting foams and their thermal insulation properties are given in Tables III and IV respectively.

The percentage observed thermal insulation loss relative to initial thermal conductivity of the cell gas mixture is shown to be significantly reduced when using Refrigerant 134a.

In this example, the observed thermal conductivity of foam comprising Refrigerant 134a within the gas mixture of the closed cells is lower after 40 days aging than foams prepared with the comparative physical blowing agent.

Polyurethane foams can be prepared where the initial cell gas mixture consists essentially of carbon dioxide (gas conductivity 16 mW/MK). Such foams at an equivalent density, typically exhibit initial foam thermal conductivities of 23 to 24 mW/MK and which on aging for the same period of time decay to values of typically 32 to 33 mW/MK. Further, such foams generally display relatively poor dimensional stability characteristics in contrast to acceptable dimensional stability properties accorded by the foams of this present invention.

It is clearly seen that foams prepared in the presence of a polyfluorocarbon compound containing no chlorine or bromine atoms exhibit reduced thermal insulation losses on aging, relative to foams prepared with the comparative, alternative blowing agents currently under consideration for commercial use in "environmentally safer" processes.

TABLE III

|  | Physical blowing agent (B.A.) | | |
| --- | --- | --- | --- |
|  | 1 (R-134a) | A* (R-11) | B* (R-142b) |
| Polyol [1] | 100 | 100 | 100 |
| Water | 1.5 | 1.5 | 1.5 |
| Isocyanate [2] | 181 | 181 | 181 |
| Isocyanate Index | 1.05 | 1.95 | 1.05 |
| BA wt % on polyol | 6.0 | 8.1 | 5.1 |
| BA wt % composition | 2.1 | 2.8 | 1.8 |
| Reactivity (sec.) CT/GT/TFT | —/37/60 | 8/35/60 | —/36/60 |
| Free-rise density | 23.9 | 23.9 | 24.1 |
| Molded foam density (kg/m$^3$) | 30 | 30 | 30 |
| Post-expansion (mm) |  |  |  |
| 3 min. (10 min. cure) | 6.6 | 6.8 | 6.3 |
| 4 min. (10 min. cure) | 4.6 | 4.6 | 5.0 |
| Compressive strengths 10% compression (KPa) II/I to rise | 145/97 | 133/75 | 135/86 |
| Average foam cell diameter (mm) | 0.40 | 0.48 | 0.44 |
| Standard deviation | 0.24 | 0.34 | 0.27 |

*Comparative example, not an example of this invention
[1] A fully formulated polyol system comprising a sucrose-glycerine initiated polyether polyol and about 3 wt % water
[2] A crude polymeric methylene diphenylisocyanate, average functionality 2.7, NCO wt percentage 31

TABLE IV

|  | 1 (R-134a) | A* (R-11) | B* (R-142b) |
| --- | --- | --- | --- |
| Calculated cell gas conductivity (mW/MK) | 16.7 | 14.5 | 15.9 |
| Observed Foam (mW/MK) |  |  |  |
| conductivity: initial | 21.8 | 20.9 | 21.8 |
| : aged (40 days) | 27.7 | 28.2 | 28.6 |
| Observed loss (mW/MK) | 5.9 | 7.3 | 6.8 |
| %; observed loss/cell gas conductivity | 35.3 | 44.1 | 42.7 |

*Comparative example, not an example of this invention

What is claimed is:

1. A closed-cell rigid polymer foam prepared from a foam-forming composition containing a physical blowing agent present in up to about 20 weight percent based on the total weight of the composition, and characterized in that the physical blowing agent comprises a $C_{2-6}$ polyfluorocarbon compound containing no chlorine or bromine atoms, and in that the cells of the foam contain the physical blowing agent as a gas in an amount which reduces the thermal insulation loss of the foam relative to the thermal insulation loss, with time, of the same foam having the same density and prepared from the same foam-forming composition in the presence of an equivalent molar quantity of a blowing agent in which a $C_{2-6}$ polyfluorocarbon compound containing no chlorine or bromine atoms is present.

2. The foam of claim 1 wherein the polyfluorocarbon compound containing no chlorine or bromine atoms is one or more selected from the group consisting of 1,1-difluoroethane (R-152A), 1,2-difluoroethane (R-152), 1,1,1-trifluoroethane (R-143a), 1,1,2-trifluoroethane (R-143), 1,1,1,2-tetrafluoroethane (R-134a), 1,2,2—tetrafluoroethane (R-134), pentafluoroethane (R-125) and hexafluoroethane (R-116): perfluoro-n-pentane and isomers thereof, perfluoro-n-hexane and perfluorocyclopropane (C-216).

3. The foam of claim 2 wherein the polyfluorocarbon compound is 1,1,1,2-tetrafluoroethane or perfluoro-n-hexane.

4. The foam of claim 3 wherein the polyfluorocarbon compound is present in from about 0.5 to about 15 weight percent based on total weight of the composition.

5. The foam of claim 3 wherein the cells of the foam initially contain a cell gas mixture that comprises up to about 60 mole percent, based on total moles of all gases present, of the polyfluorocarbon compound.

6. The foam of claim 5 wherein the cell gas mixture comprises from about 5 to about 55 mole percent based on total moles of all gases present of the polyfluorocarbon compound.

7. The foam of claim 5 wherein the initial cell gas content comprises from about 45 to about 90 mole percent carbon dioxide and from about 10 to about mole percent of the polyfluorocarbon compound based on quantities of carbon dioxide and polyfluorocarbon compound present.

8. The foam of claim 2 wherein the average overall density is from about 10 kg/m$^3$ to about 200 kg/m$^3$.

9. The foam of claim 2 wherein the polymer is a member selected from the group consisting of a polyurethane and a polyisocyanurate.

10. The foam of claim 9 wherein the polyfluorocarbon compound is 1,1,1,2-tetrafluoroethane which is present in from about 1.0 to about 10 weight percent, based on total weight of the composition, and wherein the cells of the foam initially contain from about 1 to about 60 mole percent, based on total moles of all gases present, of the polyfluorocarbon compound.

11. The foam of claim 10 prepared in the presence of water and having a density of from about 18 to about 60 kg/m3 and an average cell size of less than about 0.5 mm and wherein the cells of the foam initially contain a gas mixture consisting essentially of
    (a) from about 5 to about 55 mole percent 1,1,1,2-tetrafluoroethane, and
    (b) from about 45 to about 95 mole percent carbon dioxide.

12. A process for producing a closed-cell rigid polyurethane or polyisocyanurate polymer foam containing within its cells a gas mixture comprising a $C_{2-6}$ polyfluorocarbon compound containing no chlorine or bromine atoms characterized in that
    (a) an isocyanate-containing compound is mixed and allowed to react with an active hydrogen-containing compound in the presence of up to about 20 weight percent, based on combined weight of isocyanate-containing compound and active hydrogen-containing compound, of a physical blowing agent comprising the polyfluorocarbon compound, and
    (b) the cells of the resulting foam comprise the polyfluorocarbon compound in an amount which reduces the thermal insulation loss of the foam relative to the thermal insulation loss, with time, the same foam having the same density and prepared from the same foam-forming composition in the presence of an equivalent molar quantity of a blowing agent in which a $C_{2-6}$ polyfluorocarbon compound containing no chlorine or bromine atoms is absent.

13. An active hydrogen-containing composition suitable for reacting with an isocyanate-containing compound in the preparation of a closed-cell rigid polyurethane or polyisocyanurate foam characterized in that the composition comprises
   (a) an active hydrogen-containing compound having at least 2 active hydrogen atoms per molecule and having an equivalent weight of from about 50 to about 700, and
   (b) from about 1 to about 20 weight percent based on a combined weight of (a) and (b) present of a physical blowing agent comprising a $C_{2-6}$ polyfluorocarbon compound containing no chlorine or bromine atoms, which provides for a foam wherein the thermal insulation loss of the foam relative to the thermal insulation loss, with time, the same foam having the same density and prepared from the same active hydrogen-containing composition in the presence of an equivalent molar quantity of a physical blowing agent not comprising a $C_{2-6}$ polyfluorocarbon compound that contains no chlorine or bromine.

14. A laminate comprising at least one facing sheet adhered to the polymer foam of claim 1.

15. A process for producing a polyurethane or polyisocyanurate laminate comprising
   (a) containing at least one facing sheet with the reacting mixture of claim 11, and
   (b) thereafter foaming and curing the reacting mixture.

* * * * *

UNITED STATES PATENT AND TRADEMARK OFFICE
CERTIFICATE OF CORRECTION

PATENT NO. : 4,997,706

DATED : March 5, 1991

INVENTOR(S) : Guido F. SMits and Johan A. Thoen

It is certified that error appears in the above-identified patent and that said Letters Patent is hereby corrected as shown below:

Title page, in the abstract, line 7 of the abstract, " foams provided for " should correctly read -- foams provides for --.

Column 14, Claim 2, line 1, " (R-116): perfluoro-n-pentane " the punctuation should correctly read -- (R-116); perfluoro-n-pentane --.

Column 14, Claim 7, line 21, " 10 to about mole " should correctly read -- 10 to about 55 mole --.

Signed and Sealed this

Tenth Day of August, 1993

Attest:

MICHAEL K. KIRK

Attesting Officer

Acting Commissioner of Patents and Trademarks